United States Patent [19]

Greenberg et al.

[11] Patent Number: 4,840,813

[45] Date of Patent: Jun. 20, 1989

[54] LOW AND NON-FAT FROZEN DAIRY DESSERTS AND METHOD OF PREPARATION

[75] Inventors: Norman A. Greenberg, New Hope; Ramesh C. Chandan, New Brighton; William D. Deeslie, Maple Grove, all of Minn.; Daniel D. Conolly, Berkeley, Calif.

[73] Assignee: General Mills, Inc., Minneapolis, Minn.

[21] Appl. No.: 88,744

[22] Filed: Aug. 24, 1987

[51] Int. Cl.$^4$ .................... A23G 9/02; A23G 9/04
[52] U.S. Cl. .................... 426/565; 426/804; 426/613; 426/583
[58] Field of Search .............. 426/565, 566, 567, 804, 426/583, 613

[56] References Cited

U.S. PATENT DOCUMENTS

| | | |
|---|---|---|
| 3,128,193 | 4/1964 | Hilker . |
| 3,345,185 | 10/1967 | Pisani . |
| 3,407,075 | 10/1968 | Barker . |
| 3,510,316 | 5/1970 | Decker . |
| 3,800,036 | 3/1974 | Gabby et al. . |
| 3,809,764 | 5/1974 | Gabby et al. . |
| 3,928,649 | 12/1975 | Cobb . |
| 4,110,476 | 8/1978 | Rhodes . |
| 4,333,953 | 6/1982 | Trzecieski . |
| 4,400,405 | 8/1983 | Morley et al. . |
| 4,400,406 | 8/1983 | Morley et al. . |
| 4,435,439 | 3/1984 | Morris . |
| 4,497,841 | 2/1985 | Wudel et al. . |
| 4,518,616 | 5/1985 | Czulak . |
| 4,542,035 | 9/1985 | Huang .................... 426/565 |
| 4,631,196 | 12/1986 | Zeller . |

FOREIGN PATENT DOCUMENTS 1446144 8/1976 United Kingdom .

OTHER PUBLICATIONS

Bio-Isolates.
Ice Cream, Third Ed., W. S. Arbuckle, AVI Publishing Co., Inc. (1984), n 30–32, 44, 61, 69, 77, 83–85, 326–327, 333.
Membrane Separation Processes by L. E. Applegate, Chem. Eng., Jun. 11, 1984, n 64–89.

Primary Examiner—Jeanette Hunter
Attorney, Agent, or Firm—John A. O'Toole

[57] ABSTRACT

Low and non-fat aerated frozen dairy desserts are provided having the organoleptic charactertistics of premium, high fat ice cream but which includes 0.1% to 7.0% by weight of fat. The dessert compositions essentially comprise 20% to 25% milk solids non-fat, 1% to 7% whey protein concentrate, corn syrup solids, sucrose and water. The whey protein to casein weight ratio ranges from 1:0.5 to 4.0. The percent whey protein denaturation ranges from 50% to 100%. The total protein content is at least about 7%. The lactose concentration is less than about 4%. Liquid dessert pre-mixes for the present desserts are also provided. Preferred embodiments of the desserts are free of added stabilizers and/or emulsifiers yet nonetheless provide the present organoleptic attributes. Methods for the preparation of the new aerated frozen dairy desserts and pre-mixes are also provided.

31 Claims, No Drawings

LOW AND NON-FAT FROZEN DAIRY DESSERTS AND METHOD OF PREPARATION

BACKGROUND

1. The Technical Field

The present invention relates to food products and to their methods of preparation. More specifically, the present invention is directed towards aerated frozen dairy desserts and liquid mixes therefor comparable to high fat ice creams but which although milk based are low in fat. In its method aspect, the present invention resides in methods by which frozen dairy desserts and liquid pre-mixes can be prepared.

2. The Prior Art

Dessert products intended to be consumed while frozen have been known for a long time. The principal frozen dessert products are ice cream, ice milk, mellorines, sherbets and water ices. Ice cream is a frozen food product prepared from a mixture of dairy ingredients, sweeteners, stabilizers and emulsifiers which is pasteurized, homogenized, flavored and frozen usually under agitation while air is incorporated. Ice milk is similar to ice cream but contains less milk fat. Mellorine is similar to ice cream except that the butterfat is replaced with vegetable fats. Sherbet is a frozen dessert characterized by its tart flavor which results from adding fruit or fruit juices along with dairy ingredients and may also have added fruit acid. It is prepared from the same basic ingredients as ice cream, although the maximum total milk solids content is about 25 percent that of ice cream. Frozen water ices are a frozen product prepared from water, sugar and fruit juices, stabilizer, with or without additional acid and color, and containing no dairy product. Water ices differ from ice cream in that the overrun, or amount of air incorporated during the manufacturing process is substantially lower than that of ice cream. Governmental standards, both federal and state, of identity exist for each of these frozen desserts. Ice cream by these standards must comprise at least 10% and can comprise up to 18% fat. Ice cream manufacture is considered a highly developed art. The formulation, preparation and general description of ice cream is exhaustively described in "Ice Cream," fourth ed. by W. S. Arbuckle, The Avi Publishing Company, Inc., Westport, CT 1986.

In general, the higher the fat level in a frozen dessert, especially ice creams, the more pleasing and appetizing has been its texture and flavor. Such preferred ice creams have been sometimes referred to as "premium" ice creams. In response to current consumer taste fashions, premium and even "super premium" ice creams have become increasingly popular. In addition to very high fat contents of typically about 14% to 18%, such ice creams are also frequently characterized by high milk solids and low degrees of overrun, i.e., the amount of air incorporated into the composition, resulting in higher densities. While popular and organoleptically desirable, these premium ice creams with higher fat contents are more costly due to the relatively high cost of the butterfat ingredient. And, too, the calorie content of the frozen dessert is higher. Also, cholesterol levels are higher.

For these reasons, the prior art includes many attempts at providing a low fat frozen dessert which nonetheless exhibits the desirable organoleptic attributes of the high fat or even super premium ice creams. In spite of these many attempts and contrary to the many self proclaimed teachings that equivalent attributes have been obtained in a low fat composition, prior to the present invention there has not yet been a good low fat, high quality, milk based aerated frozen dessert.

Ice cream generally comprises butterfat, milk solids non-fat ("MSNF"), sweeteners, water and minor amounts of everything else, e.g., flavors, salt, stabilizers, emulsifiers, etc., although large amounts of other materials, e.g., nuts, fruit, cookie chips, etc., can be distributed throughout. By a "reduced fat" or equivalently a low fat frozen dairy dessert is meant a product having the fat-like organoleptic attributes of an ice cream prior to flavor addition having 10% to 18% butterfat, but having a fat level of less than 10%, i.e., less than ice cream. By "no-fat" or "non-fat" is meant a frozen dairy dessert which has no added butter or vegetable fat. Such products typically will have fat levels of less than 0.5%.

If in the provision of a low fat or reduced fat frozen dairy dessert, all or part of the butterfat is to be replaced, then equivalent amounts of solids must be supplied by the MSNF and/or the sweeteners or other ingredients. However, in view of the vast array of milk based ingredients and their potential modification through processing, the large variety of sweeteners, emulsifiers and stabilizers, their potential combinations are nearly infinite. Unfortunately, a result is that the teachings of the prior art are frequently self contradictory. One reference may teach the criticality of certain stabilizers, while another may teach that such materials are optional or even to be avoided. Some references may teach the equivalency of some materials while other references may directly so contradict.

U.S. Pat. No. 3,345,185 (issued Oct. 3, 1967 to Pisani et al.) for example, discloses a low fat, milk based aerated frozen dessert wherein the butterfat constituent is replaced with non-fat milk solids from powder or condensed skim milk. To overcome the "sandiness" defect caused by high lactose levels resulting from this substitution, higher levels of corn syrup solids are employed. (See also U.S. Pat. No. 3,407,075 issued Oct. 22, 1968 to Barker) which shows a reduced fat butter-like product wherein milk solids partially replace butterfat. In U.S. Pat. No. 3,510,316 (issued May 5, 1970 to Decker) a similar product has added fine crystalline lactose to prevent sandiness caused by lactose crystallization.

A reduced fat, milk based, aerated frozen dessert is disclosed in U.S. Pat. No. 3,128,193 (issued Apr. 7, 1964 to Hilker) which is made using a special high sheer mixing step. The high sheer step imparts greater fat-like properties to the product using the reduced fat amounts. U.K. patent 1,446,144 (published Aug. 18, 1976 to Kraftco) discloses a reduced fat, aerated frozen dessert using special emulsifiers to impart fat-like properties. A similar approach but employing different emulsifiers and optionally certain stabilizers is disclosed in U.S. Pat. No. 3,800,036 (issued Mar. 26, 1974 to Gabby et al.) or in U.S. Pat. No. 3,809,764 (issued May 7, 1974 to Gabby et al.). In U.S. Pat. No. 4,435,439, an aerated frozen low fat dessert is disclosed of the sherbet type using both emulsifiers and stabilizers to improve the sherbet's attributes. Since emulsifiers affect fats, some fat must be present in order to obtain the benefits of the emulsifier. Thus, while emulsifier manipulation may have benefits in providing reduced fat frozen dairy desserts, such approaches have little utility in connection with no fat dairy desserts.

U.S. Pat. No. 4,400,405 (issued Aug. 23, 1983 to Morley et al.) discloses a dietetic lower fat aerated frozen dessert employing high levels of stabilizers, emulsifiers and polyhydric alcohols. A reduced fat aerated frozen dessert with polyhydric alcohols is disclosed in U.S. Pat. No. 3,928,649 (issued Dec. 23, 1975 to Cobb).

A reduced fat milk based aerated dessert prepared at home by static freezing from a two component mix is described in U.S. Pat. No. 4,282,262 (issued Aug. 4, 1981 to Blake). While one component is a concentrated milk blend which is specially heat treated to improve the functionality of the milk constituents by nearly complete protein denaturization, heavy reliance for end product attributes is placed upon use of certain casein reactive gums as stabilizers.

More recently, as whey protein concentrates have become more widely available, their use in ice cream products has become more common. For example, U.S. Pat. No. 4,497,841 (issued Feb. 5, 1985 to Wudel et al.) discloses a reduced fat, milk based aerated frozen dessert wherein whey protein concentrate is preferably employed in partial substitution for and along with MSNF (milk solids non-fat). Fructose is used as the sweetening agent. Conventional emulsifiers and stabilizers are used to improve the dessert properties.

In U.S. Pat. No. 4,333,953 (issued June 8, 1982 to Trzecieski) a creamy, low fat aerated frozen dessert is described using high levels of milk solids not-fat for the fat and containing lactase which by hydrolyzing lactose into glucose and galactose is taught to reduce the problem of sandiness. The U.S. Pat. No. 4,333,953 patent also teaches that demineralized whey protein can be used in partial substitution for the MSNF. However, flavor problems exist when many types of whey powders are added.

In spite of these numerous prior art attempts, to date, no low fat aerated, milk based frozen dessert has enjoyed commercial popularity.

The difficulties in formulating a low fat milk based aerated frozen dessert are compounded by lactose crystallization as well as the freezing point depression that occurs when fat solids are replaced by lower molecular weight compounds. Stability problems are more severe with bulk frozen items compared with soft serve. Soft serve frozen products are typically consumed shortly after preparation. In contrast, bulk frozen ice cream typically is stored through various distribution channels before sale. Due to the inevitable temperature fluctuations that occur during this distribution, the heat shock stability of ice creams is very important. Unfortunately, low fat ice creams are particularly vulnerable to heat shock instability by virtue of the absence of the fat component.

Surprisingly, the above problems have been overcome and superior aerated frozen dairy dessert compositions have been developed which exhibit the organoleptic attributes of high fat ice creams which nonetheless is a low fat composition. The dairy dessert compositions are prepared with high levels of whey protein and with specific casein to whey ratios.

SUMMARY OF THE INVENTION

In its product aspect, the present invention first provides non-fat aerated frozen dairy dessert compositions for bulk ice cream distribution as well as liquid dessert mixes therefor. Despite being characterized by very low fat levels, the dessert products exhibit superior fat-like, organoleptic attributes and, more surprisingly, the heat shock stability comparable to premium ice creams. The present invention also provides non-fat aerated dairy dessert compositions for soft serve ice cream and liquid dessert mixes therefor. Also provided are reduced fat, aerated frozen dairy dessert products and liquid dessert mixes for both bulk and soft serve which are organoleptically comparable to super premium ice creams. The reduced fat dessert compositions are characterized by higher fat contents compared to the present low fat dessert compositions.

In its process aspect, the present invention resides in heat treatment methods for preparing the dessert compositions involving specific heat treatment of the liquid dessert mixes in combination with the specific ingredients used within specified concentrations and ratios.

DETAILED DESCRIPTION OF THE INVENTION

In its composition aspect, the present invention provides various milk based, non-fat or reduced fat aerated frozen desserts which have the organoleptic characteristics of high fat ice cream. Also, the present invention provides liquid mixes from which these desserts can be prepared by conventional agitated freezing which are heat shock stable. The dessert compositions comprise milk solids not-fat, a defined whey protein concentrate, sweeteners and water. In its method aspect, the invention resides in the process for preparing the present frozen desserts and liquid mixes therefor from skim milk, whey protein concentrate and sweeteners. Each of the composition constituents and essential characterizing product features and preparation steps are described in detail below.

Throughout the specification and claims, percentages and ratios are by weight and temperatures in degrees Fahrenheit unless otherwise indicated.

In the preferred method of preparing the present dessert products, the first step is to concentrate skim milk via ultrafiltration to obtain an ultrafiltered skim milk concentrate or retentate. Typically, bovine skim milk will have the following composition:

| Solids | | 9.00% |
|---|---|---|
| Lactose | 4.90% | |
| Casein | 2.60 | |
| Whey protein | 0.60 | |
| Fat | 0.04 | |
| Ash | 0.86 | |
| Water | | 91.00 |
| | | 100.00% |

In the most preferred embodiment, the skim milk is concentrated via ultrafiltration from its original 9% solids to a total solids concentration of about 20% to 23%, preferably about 22% to 23%, that is, about a five-fold concentration of the high molecular weight materials such as the fat and proteins. Low molecular weight ingredients such as salts and lactose typically are not concentrated proportionally. The material is referred to as a five-fold concentration since the protein concentration is increased approximately five-fold. Such a five-fold concentrated ultrafiltered concentrate is referred to herein as a "5X UF skim milk." Such a 5X UF skim milk is commercially available or can easily be prepared using conventional ultrafiltration apparatus and techniques (see for example: "Reverse Osmosis and Ultra-Filtration in the Food Industry Review" by T. I Hedrick. Drying Technology, 2 (3) 329–352 (1983–84)

or "Membrane Separation Processes," by Lynn E. Applegate, Chemical Engineering, June 11, 1985). 5X UF skim milk typically has the following compositions:

| Solids | | 22.00% |
|---|---|---|
| Casein | 12.00% | |
| Whey protein | 3.00 | |
| Lactose | 4.00 | |
| Fat | 0.40 | |
| Ash | 2.60 | |
| Water | | 78.00 |
| | | 100.00% |

Surprisingly, other concentrated non-fat milk derived materials can be used in full or partial substitution for the ultrafiltration skim milk concentrate without seriously adversely affecting product quality although some reduction in product quality appears. For example, when total milk protein is used in substitution, a less creamy, fatty mouthfeel is obtained. Skim milk powder, also known as non-fat dry milk, gives a more gritty, non-creamy mouthfeel to the product. Similarly, condensed skim milk imparts to the finished frozen dessert a somewhat cooked flavor and mouthfeel which is both chalky and reminiscent of an over-stabilized ice cream.

It is important, however, that when these other milk solids sources are utilized that the concentrated milk blend described below importantly meet the casein to whey protein ratios, protein concentration, protein denaturation and other essential features described below.

Thereafter, in the preferred embodiment, the 5X UF skim milk is heat treated to denature the whey protein. Importantly, the concentrated milk is heated for times and at temperatures to substantially (greater than 50%, preferably greater than 80%, and for best results, greater than 90%) denature the whey protein component of the skim milk. Preferred heat treatment conditions herein are shorter times, higher temperatures. For best results, it has been found desirable to heat the 5X UF skim milk at 250° F. for about six minutes. The skilled artisan will appreciate that these conditions far exceed the heat treatment need for pasteurization. When other milk solids sources are used in full or partial substitution for the 5X UF skim milk, it is important that the whey protein component thereof be denatured since the present heat treatment for whey denaturation occurs in solution so as to allow maximum hydration of the whey protein.

In the preferred embodiment, the whey denatured, 5X UF skim milk is next essentially admixed with additional, single strength undenatured skim milk and a defined whey protein concentrate to form a concentrated milk blend. Whey protein concentrates are defined in the art as the substance obtained by the removal of sufficient non-protein constituents from whey so that the finished dry product contains no less than 25% protein. Some whey protein concentrates can contain up to 60% lactose, and some have ash or mineral contents as high as 15%. Importantly, the whey protein used herein is demineralized, i.e., having an ash content of less than about 3.5%. Also, the whey protein concentrate is desirably low in lactose content, i.e., having a lactose content of less than 0.5%, preferably as minimal as possible. Importantly too, the whey protein concentrate useful herein is desirably undenatured, i.e., fully soluble. Such specially defined whey protein concentrates as are useful herein are commercially available. For example, useful herein is a whey protein concentrate or "dairy albumen" from LeSueur Isolates, LeSueur, Minnesota, USA, under the trademark of BI-PRO.

The concentrated milk blend admixture contains UF skim milk, skim milk and whey protein concentrate or other milk solids materials in such proportions so as to have the following composition:

TABLE 1

| | Weight % | | | |
|---|---|---|---|---|
| Constituent | Non-Fat Bulk | Non-Fat Soft Serve | Reduced Fat Bulk | Reduced Fat Soft Serve |
| Butterfat | <1% | <1% | 1–9% | 1–9% |
| Total protein | 8–10 | 8–10 | 7–9 | 7–9 |
| Lactose | 0–4 | 0–10 | 0–4 | 0–10 |
| Water | 55–65 | 55–65 | 55–65 | 55–65 |
| Ash | 0.5–1.5 | 0.6–2.0 | 0.5–1.5 | 0.6–2.0 |

Better results are obtained when the wet blend admixture has the composition given in Table 2:

TABLE 2

| | Weight % | | | |
|---|---|---|---|---|
| Constituent | Non-Fat Bulk | Non-Fat Soft Serve | Reduced Fat Bulk | Reduced Fat Soft Serve |
| Butterfat | <0.5% | <0.5% | 2–7% | 2–7% |
| Total protein, more preferable | 8.5–9.5 9.0 | 7.5–8.5 8.0 | 7.5–8.5 8.0 | 7.5–8.5, 8.0 |
| Lactose, more preferable | 0–3 3.0 | 5–9 7.0 | 0–3 3.0 | 5–9 7.0 |
| Water, more preferable | 60–64 62 | 60–64 62 | 60–64 62 | 60–64 62 |
| Ash more preferable | 0.8–1.2 1.0 | 1.4–1.8 1.5 | 0.8–1.2 1.0 | 1.4–1.8 1.6 |

For each embodiment, however, it is also essential that the ratio of whey protein to casein in the admixture or concentrated milk blend range from about 1:0.5 to 1:4, preferably about 1:1 to 2, and most preferably about 1:1.3. Thus, the essential weight ratio of casein to whey in the present compositions is dramatically different than that which is observed in milk or conventional, full fat ice creams. It is also essential that the total protein be within the above essential range in order to provide the fat like benefits herein. By way of comparison, the present minimum essential protein concentration is approximately double conventional ice cream's protein concentration. It is also important that the whey protein be substantially undenatured, preferably at least 50%, more preferably 70% of the protein is undenatured.

It will be readily apparent to the skilled artisan that minor variations can be practiced even within the preferred embodiment to realize the concentrated milk blend without departing from the spirit of the invention. For example, less skim milk may be employed if less concentrated UF skim milk is used instead of the preferred five-fold concentrate. More whey protein concentrate can be employed.

Although not preferred, non-fat dry milk ("NFDM") can be used as a replacement for liquid skim milk solids due to cost and flavor considerations.

The UF skim retentate can be replaced by a blend of caseinates (sodium, potassium, calcium, or sodium-potassium), in combination with various WPC's. Such blends would simulate the composition of the retentate and approach the functional attributes of the retentate. These alternative ingredients would be most useful in the low fat variations but not in the preferred non-fat embodiment.

In the next step of the present method, the concentrated milk blend is essentially combined with the dry ingredients to form a liquid pre-mix or, synonymously, sweetened mixture. Conveniently, all the dry ingredients can be pre-blended. The wet and dry ingredients are admixed in conventional manner to form a uniform or homogeneous mixture. The liquid pre-mix can be heated to 150° F. to 170° F. (66° C. to 77° C.) to facilitate uniform blending and dispersion.

The dry blend contains all the essential and optional dry ingredients. One essential dry blend ingredient is a nutritive carbohydrate sweetening agent and is desirably added in amounts so as to comprise from about 14% to 18% of the liquid pre-mix, preferably about 15% to 16.5%. For best results, the sweetener should comprise about 15.5%. Sucrose is the preferred sweetener.

A highly preferred dry blend ingredient is corn syrup solids which can be used in partial substitution for sucrose as the sweetener. The corn syrup solids can comprise from 0.1% to 6% of the pre-mix, preferably about 4% to 5%. For best results, the corn syrup solids should comprise about 4.5%. Of course, corn syrups can be used and indeed are preferred for use for the provision of the corn syrup solids herein. Corn syrups are preferred for cost, flavor and materials handling considerations. Especially desirable for use herein are corn syrup solids of intermediate sweetness, e.g., about 36 D.E. corn syrup solids, which further enhance the stability of the frozen dessert. Lower D.E. corn solids generally provide desirable increases in viscosity but less sweetness. Higher D.E. corn solids yield dessert mixes which are too thin, i.e., are too soft at given temperatures, which are excessively sweet, and which are more prone to heat shock instability. Other combinations of low intensity sweeteners such as hydrogenated corn syrups, maltose and other types of low molecular weight materials may also be used but are not preferred. In less preferred embodiments, conventional ice cream and frozen dessert stabilizers may also be used to enhance heat shock stability.

High potency or non-nutritive sweetening agents such as aspartame, saccharine, cyclamates, etc. can be used in partial substitution for the nutritive carbohydrate sweeteners to provide equivalent sweetness levels so long as the present compositions contain about the same levels of solids.

Thereafter, the liquid pre-mix is then heated for a second time for times and at temperatures sufficient to substantially denature the whey protein associated with the skim milk and the whey protein concentrate to greater than 50%, preferably greater than 80%, and most preferably 90% thereby forming the liquid dessert mixes of the present invention. Good results have been obtained when the liquid pre-mix is heated to 180° F. to 185° F. (82° C. to 85° C.) for about 20 to 30 minutes when heated in a batch mode. Short time, high temperature processing can be used when continuous processing is employed. For example, at 215° F., heat times range from 5 to 8 minutes.

The novel liquid dessert mix prepared by the present invention is characterized by the following composition:

TABLE 3

| Constituent | Weight % | | | |
|---|---|---|---|---|
| | Non-Fat Bulk | Non-Fat Soft Serve | Reduced Fat Bulk | Reduced Fat Soft Serve |
| Fat | <1.0 | <1.0 | 1-9 | 1-9 |
| Casein | 4.5-7.2 | 4.5-7.2 | 4.0-6.7 | 4.0-6.7 |
| Whey protein | 2.0-4.5 | 2.0-4.5 | 1.5-4.0 | 1.5-4.0 |
| Lactose | 0-4 | 0-10 | 0-4 | 0-10 |
| Ash | 0.5-1.5 | 0.5-2.0 | 0.5-1.5 | 0.6-2.0 |
| Sucrose | 14-18 | 14-18 | 13-17 | 13-17 |
| Corn syrup solids | 0-6 | 0-6 | 0-6 | 0-5 |
| Flavor | 0.1-5.0 | 0.1-5.0 | 0.1-5.0 | 0.1-5.0 |
| Moisture | 55-65 | 55-65 | 55-65 | 55-65 |

Better results in terms of high fat character are obtained when the liquid dessert mixes are characterized by the following composition:

TABLE 4

| Constituent | Weight % | | | |
|---|---|---|---|---|
| | Non-Fat Bulk | Non-Fat Soft Serve | Reduced Fat Bulk | Reduced Fat Soft Serve |
| Fat | <0.5 | <0.5 | 2-7 | 2-7 |
| Casein | 4.5-6.0 | 4.5-6.0 | 4.0-5.5 | 4.0-5.5 |
| Whey protein | 3.0-4.5 | 3.0-4.5 | 2.5-4.0 | 2.5-4.0 |
| Lactose | 0-3.1 | 3.0-4.5 | 2.5-4.0 | 3.0-4.5 |
| Ash | 0.8-1.2, | 1.4-1.8, | 0.8-1.2, | 1.4-1.8, |
| more preferable | 1.0 | 1.5 | 1.0 | 1.6 |
| Sucrose | 15-17 | 15-17 | 14-16 | 14-16 |
| Corn syrup solids | 2-5 | 2-5 | 2-5 | 2-5 |
| Flavor | 0.3-5.0 | 0.3-5.0 | 0.3-5.0 | 0.3-5.0 |
| Moisture | 60-64 | 60-64 | 60-64 | 60-64 |

The whey to casein ratios, of course, are as described above. The viscosity importantly ranges from about 500 to 5,000 cp. at 40° F. (5° C.).

The present liquid dessert mixes are useful in the preparation of both soft serve and traditional aerated frozen desserts. The liquid dessert mixes can be distributed in bulk for large scale production for bulk simulated ice cream or for use in frozen novelty fabrication. Also, smaller sized packages, e.g., one gallon can be used in the food service industry for use in the preparation of soft serve frozen aerated desserts.

Mixes intended to be used in the preparation of soft serve frozen desserts are much more tolerant of lactose. Accordingly, liquid dessert mixes for soft serve aerated frozen desserts can comprise from as little as 0.1% up to about 10% by weight lactose without departing from the spirit of the invention although the preferred compositions comprise less than 4%. Soft serve aerated frozen desserts are typically consumed soon after preparation, especially in fast food outlets. Soft serve frozen desserts are typically characterized by a higher temperature, e.g., 23° F. to 27° F. (−3° C. to −5° C.) as well as lower overrun percentages, e.g., 30% to 70%.

Bulk aerated frozen desserts are typically prepared with higher overruns ranging from about 70% to 80% for packaged ice cream, about 40% to 100% for bulk ice cream and about 35% to 45% for super premium ice creams and exit the agitated freezer at temperatures of about 21° F. to 23° F. (−5° C. to −6° C.). Also, after aearating and freezing, bulk frozen desserts are typically subjected to a hardening step during which the product is kept in a cold environment, −20° F. to −30° F. (−29° C. to −35° C.), for 0.5 to 24 hours for five gallon bulk packs so as to reduce the temperature of the product to these temperatures. Liquid dessert mixes for bulk aerated frozen desserts essentially comprise less than about 4% lactose, preferably less than about 3%, and for best results as little lactose as possible.

The skilled artisan will appreciate that the above described highly preferred product embodiments contain only milk based ingredients, sweeteners and flavors and do not contain any emulsifiers, stabilizers or other ingredients perceived by consumers as being artificial. Accordingly, it is an advantage that the present invention can be used to prepare milk based low fat aerated frozen desserts which are "all natural," which for purposes of this invention is used to describe products hereof which are free of added emulsifiers and stabilizers.

Moreover, while preferred embodiments are non-fat, namely, less than about 1% fat, preferably less than 0.5% fat, it will be appreciated that additional butterfat can be added to the liquid pre-mix in conventional manner to provide a frozen product with "super premium" organoleptic attributes but employing much reduced fat levels, e.g., 1% to 9.9% butterfat. Indeed, addition of even as little as 1% to 2% butterfat will dramatically improve perceived product quality. Thus, while 5X UF skim milk is the preferred milk solids source for the low fat embodiments herein, other lower quality milk solids sources can be used to prepare acceptable finished products with 1% to 2% added butterfat due to the masking effects of even this low butterfat level. However, the protein concentration and casein to whey ratios must be maintained even with added butterfat.

The present dessert compositions can optionally contain a variety of additional ingredients suitable for rendering such compositions even more organoleptically or aesthetically desirable or nutritious. Such optional ingredients include, for example, flavors, coloring agents, nuts, cookie bits, vitamins, preservatives and the like. If present, such minor optional components should each comprise about 0.1% to 5% of the dessert compositions.

One preferred optional ingredient is conventional stabilized fruit for ice cream. Stabilized fruit for ice cream is commonly used in the ice cream industry. Such material comprises fruit pieces which have been sugar or gum treated to remain soft at the typical freezer temperatures at which ice cream is typically stored, e.g., about 0° to 8° F. If present, such stabilized fruit can be used at from about 0.1% to 20% by weight of the present dessert compositions, preferably from about 5% to 10%. Stabilized fruit is desirably added to the present composition just prior to aeration and freezing.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of those in the food art, can be undertaken without departing from the spirit and scope of the invention.

EXAMPLE 1

A non-fat dairy dessert composition especially useful as a bulk packed dairy dessert was prepared having the following composition:

| Ingredient | Weight % |
| --- | --- |
| Skim milk | 38.2 |
| 5X skim milk retentate | 33.7 |
| Sucrose | 17.1 |
| 36 D.E. corn syrup solids | 4.5 |
| Maltodextrin (10 D.E.) | 3.3 |
| Whey proein concentrate powder[1] | 3.0 |
| Vanilla flavor | 0.2 |
|  | 100.0% |

[1] Available from Le Sueur Isolates (Le Sueur, MN) under the trade name BIPRO and having a mineral content of less than 3% and a lactose content of less than 1%. The whey protein powder is characterized by minimal whey denaturation.

The five-fold concentrated milk is prepared in the following manner. A small quantity of skim milk is ultrafiltered by being passed through a hollow fiber ultrafilteration unit commerically available from Romicon, type 50 HM. The 5X skim milk concentrate had the composition given above in the specification.

Thereafter, the 5X skim milk retentate was heated at 250° F. for six minutes to fully denature its whey protein. Next, the whey denatured skim milk concentrate was admixed with the skim milk and the whey protein concentrate to form a milk blend. The milk blend has a total protein value of 9.5% while the whey protein to casein ratio was 1:1.1.

The milk blend was then heated to 160° F. to facilitate blending and was admixed with a dry blend of the remaining ingredients to form a wet blend. The wet blend was then heated at 180° F. for 20 minutes to denature the added whey protein from the whey protein concentrate. The viscosity after preparation was 50 to 720 cp at 40° F.

The dairy dessert composition so prepared is useful for the preparation of an aerated, non-fat dairy dessert. Such a frozen dessert product was prepared by running the liquid dessert composition through a conventional ice cream freezer to aerate and freeze the liquid to form a frozen dessert having a temperature of 20° F. and an overrun of about 40% to 80%. The dairy dessert was then packaged in pint or quart containers and hardened in a blast freezer at −25° F. for two hours.

The non-fat aerated dairy dessert so prepared exhibited the organoleptic properties characteristic of a full fat ice cream yet the following composition:

| Butterfat | 0.23% |
| --- | --- |
| Protein | 9.57% |
| Calcium | 1.57% |
| Cholesterol | 5.1 mg/100 g |
| Total sugar | 26.5% |
| Total solids | 37.8% |
| Ash | 0.99% |

EXAMPLE 2

A chocolate non-fat dairy dessert composition especially useful as a bulk packed dairy dessert was prepared substantially according to the procedure described in Example 1 having the following composition:

| Ingredient | Weight % |
| --- | --- |
| Skim milk | 37.3 |
| 5X skim milk retentate | 33.0 |
| Sucrose | 16.6 |
| 36 D.E. corn syrup solids | 4.4 |
| Maltodextrin (10 D.E.) | 3.3 |

-continued

| Ingredient | Weight % |
|---|---|
| Whey protein concentrate powder[1] | 2.9 |
| Cocoa (11% fat) | 2.2 |
| Vanilla flavor | 0.3 |
| | 100.0% |

[1]Available from LeSueur Isolates (Le Sueur, MN) under the trade name BIPRO and having a mineral content of less than 3%, a lactose content of less than 1%.

The non-fat aerated dairy dessert so prepared exhibited the organoleptic properties characteristic of a full fat ice cream yet had the following composition:

| | |
|---|---|
| Fat | 0.45% |
| Protein | 9.60% |
| Calcium | 1.56% |
| Cholesterol | 4.4 mg/100 g |
| Total sugar | 26.5% |
| Total solids | 36.48% |
| Ash | 1.16% |

EXAMPLE 3

A chocolate non-fat dairy dessert composition especially useful as a soft serve dessert is prepared substantially according to the procedure described in Example 1 having the following composition:

| Ingredient | Weight % |
|---|---|
| Skim milk | 56.0 |
| Condensed whey protein[1] | 19.6 |
| Sucrose | 15.2 |
| Total milk protein[2] | 3.0 |
| Maltodextrin (10 D.E.) | 2.9 |
| Cocoa | 2.0 |
| NFDM | 1.0 |
| Vanilla flavor | 0.3 |
| | 100.0% |

[1]Available from Ridgetech (LaCrosse, WI) under the trade name RT-34 and having a protein content of 14%, 40% solids, mineral content of less than 3%, and a lactose content of about less than 23%.
[2]Available from New Zealand Milk Products (Petaluma, CA) under the trade name TMP 1230 and having an ash content of less than 6%, a lactose content of less than 1%.

However, in preparing this product, the sweetened mixture was heated to 180° F. and held for 20 minutes so as to denature the whey protein.

The non-fat aerated dairy dessert so prepared exhibited the organoleptic properties characteristic of a full fat ice cream yet had the following composition:

| | |
|---|---|
| Fat | 0.27% |
| Protein | 7.99% |
| Calcium | 0.89% |
| Cholesterol | 7.9 mg/100 g |
| Total sugar | 24.48% |
| Total solids | 34.12% |
| Ash | 1.63% |

EXAMPLE 4

A non-fat dairy dessert composition especially useful as a bulk pack dairy dessert was prepared substantially according to the procedure described in Example 1 having the following composition:

| Ingredient | Weight % |
|---|---|
| Skim milk | 69.0 |
| Sucrose | 18.8 |
| Whey protein concentrate powder[1] | 4.0 |
| Total milk protein[2] | 3.0 |
| Dextrose | 3.0 |
| Maltodextrin (10 D.E.) | 2.0 |
| Vanilla flavor | 0.2 |
| | 100.0% |

[1]Available from Le Sueur Isolates (Le Sueur, MN) under the trade name BIPRO and having a mineral content of less than 3%, a lactose content of less than 1%.
[2]Available from New Zealand Milk Products (Petaluma, CA) under the trade name TMP 1230 and having an ash content of less than 6%, a lactose content of less than 1%.

In the preparation of this product, the sweetened mixture of milk and dry ingredients are first heated to 180° F. and thereafter, the mixture is deodorized at 23 to 25 inches Hg of vacuum. Then the deodorized mixture is homogenized at pressures of 500 to 1200 psi in order to complete dispersion of the dry ingredients. Next, the homogenized mixture is again heated to 180° F. for six minutes in order to complete the denaturation of the whey protein. After cooling, the liquid dessert mix is then formed into a frozen dessert by conventional agitated freezing in a conventional ice cream maker.

A non-fat dairy dessert composition of substantially similar organoleptic attributes is prepared when the whey protein concentrate powder identified above is substituted with a protein based equivalent amount of whey protein concentrate available from Foremost Foods under the trade name Daritek HL #358.

The non-fat aerated dairy dessert so prepared exhibits the organoleptic properties characteristic of a full fat ice cream yet has the following composition:

| | |
|---|---|
| Fat | 0.15% |
| Protein | 8.76% |
| Calcium | 0.99% |
| Cholesterol | 3.1 mg/100 g |
| Total sugar | 25.2% |
| Total solids | 34.6% |
| Ash | 0.82% |

EXAMPLE 5

A chocolate non-fat dairy dessert composition especially useful as a soft serve dairy dessert was prepared substantially according to the procedure described in Example 1 having the following composition:

| Ingredient | Weight % |
|---|---|
| 5X skim milk retentate | 29.5 |
| Skim milk | 29.5 |
| Condensed whey protein | 19.6 |
| Sucrose | 15.2 |
| Maltodextrin (10 D.E.) | 2.9 |
| Cocoa (11% fat) | 2.0 |
| NFDM | 1.0 |
| Vanilla flavor | 0.3 |
| | 100.0% |

The five-fold concentrated milk is prepared as described in Example 1.

The dairy dessert composition so prepared is useful for the preparation of an aerated, low fat dairy dessert. Such a frozen dessert product is prepared by running the liquid dessert composition through a conventional ice cream freezer to aerate and freeze the liquid to form a frozen dessert having a temperature of 20° F. and an overrun of about 40% to 60%. The dairy dessert is then packaged in a pint or quart container and hardened in a blast freezer at −25° F. for two hours.

The non-fat aerated dairy dessert so prepared exhibits the organoleptic properties characteristic of a full fat ice cream yet has the following composition:

| | |
|---|---|
| Butterfat | 0.40% |
| Protein | 9.72% |
| Calcium | 1.66% |
| Cholesterol | 4.7 mg/100 g |
| Total sugar | 27.3% |
| Total solids | 37.8% |
| Ash | 1.58% |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for preparing a liquid mix useful for making an aerated milk based frozen dessert of reduced fat content having the organoleptic properties of high fat ice creams, comprising the steps, in sequence of:
   A. providing a sweetened milk blend mixture comprising,
      (1) about 0.1% to about 9% butterfat by weight of the mixture,
      (2) about 4% to about 7% by weight of the blend of casein,
      (3) about 1.5% to about 4% by weight of the mixture of whey protein,
      (4) about 13% to about 17% by weight of the mixture of sucrose,
      (5) about 0.5% to about 2% dry weight of the mixture is ash, wherein the lactose concentration of the mixture is less than 10%, wherein the whey protein to casein ratio ranges from about 1:0.5 to 3, wherein at least a portion of the whey protein is undenatured;
   B. heating the mixture at temperatures and times sufficient to provide the mixture with a whey protein denaturation ranging from about 50% to 100%;
   C. cooling the mixture to a temperature ranging from 40° F. to 70° F. to form a cooled liquid dessert composition.

2. The method of claim 1 wherein Step A comprises the sub-steps, in sequence of:
   ultrafiltering skim milk to concentrate the milk to a concentrate having about 20% to 23% solids non-fat, about 0.1% to 1.0% milk fat and the balance moisture;
   heating the milk concentrate at temperatures for times sufficient to prepare a denatured milk concentrate characterized by a denatured protein value of greater than 50%;
   admixing sufficient undenatured whey protein concentrate and skim milk to the denatured milk concentrate to form a wet blend, and wherein the whey protein in the whey protein concentrate is undenatured, in amounts sufficient such that the total protein of the blend ranges from 8% to 10%, the ratio of whey protein to casein ranges from 1:0.5 to 3;
   admixing a dry blend to the wet blend to form a sweetened mixture, said dry blend consisting essentially of
      about 14% to 18% sucrose, by weight of the mixture, and
      about 0% to 6% corn syrup solids.

3. The method of claim 2 wherein the sweetened mixture has a concentration as follows:

| Constituent | Weight % |
|---|---|
| Butterfat | 0.1–9 |
| Total protein | 7.5–10 |
| Lactose | 0–10 |
| Water | 55–65 |
| Ash | 0.5–2.0 |

4. The method of claim 3 wherein said whey protein concentrate has the following composition:

| Constituent | Percent |
|---|---|
| Protein | >90 |
| Fat | <0.5 |
| Lactose | <0.5 |
| Ash | 2.5 to 3.5 |

5. The method of claim 3 wherein the sweetened mixture is useful for a non-fat bulk frozen dessert having the following composition:

| Constituent | Weight % |
|---|---|
| Butterfat | <1 |
| Total protein | 8–10 |
| Lactose | 0–4 |
| Water | 55–64 |
| Ash | 0.5–1.5 |

6. The method of claim 3 wherein the sweetened mixture is useful for a non-fat soft serve frozen dessert having the following composition:

| Constituent | Weight % |
|---|---|
| Butterfat | <1 |
| Total protein | 8–10 |
| Lactose | 0–10 |
| Water | 55–65 |
| Ash | 0.5–2.0 |

7. The method of claim 3 wherein the sweetened mixture is useful for a reduced fat bulk frozen dessert having the following composition:

| Constituent | Weight % |
|---|---|
| Butterfat | 1–9 |
| Total protein | 7–9 |
| Lactose | 0–4 |
| Water | 55–65 |
| Ash | 0.5–1.5 |

8. The method of claim 3 wherein the sweetened mixture is useful for a reduced fat soft serve frozen dessert having the following composition:

| Constituent | Weight % |
| --- | --- |
| Butterfat | 1–9 |
| Total protein | 7–9 |
| Lactose | 0–10 |
| Water | 55–65 |
| Ash | 0.6–2.0 |

9. The method of claim 3 wherein the sweetened mixture is useful for a frozen dessert having the following composition:

| Constituent | Weight % |
| --- | --- |
| Butterfat | <0.5–7 |
| Total protein | 7.5–8.5 |
| Lactose | 0–9 |
| Water | 60–64 |
| Ash | 0.8–1.8 |

10. The method of claim 9 wherein the sweetened mixture is useful for a non-fat bulk frozen dessert having the following composition:

| Constituent | Weight % |
| --- | --- |
| Butterfat | <0.5 |
| Total protein | 8.5–9.5 |
| Lactose | 0–3 |
| Water | 60–64 |
| Ash | 0.8–1.2 |

11. The method of claim 9 wherein the sweetened mixture is useful for a non-fat soft serve frozen dessert having the following composition:

| Constituent | Weight % |
| --- | --- |
| Butterfat | <0.5–7 |
| Total protein | 7.5–8.5 |
| Lactose | 0–9 |
| Water | 60–64 |
| Ash | 1.4–1.8 |

12. The method of claim 9 wherein the sweetened mixture is useful for a reduced fat bulk frozen dessert having the following composition:

| Constituent | Weight % |
| --- | --- |
| Butterfat | 2–7 |
| Total protein | 7.5–8.5 |
| Lactose | 0–3 |
| Water | 60–64 |
| Ash | 0.8–1.2 |

13. The method of claim 3 wherein the sweetened mixture is useful for a reduced fat soft serve frozen dessert having the following composition:

| Constituent | Weight % |
| --- | --- |
| Butterfat | 2–7 |
| Total protein | 7.5–8.5 |
| Lactose | 3–4.5 |
| Water | 60–64 |
| Ash | 1.4–1.8 |

14. The method of claim 5 wherein said whey protein concentrate has the following composition:

| Constituent | Percent |
| --- | --- |
| Protein | >90 |
| Fat | <0.5 |
| Lactose | <0.5 |
| Ash | 2.5 to 3.5 |

15. The method of claim 4 additionally comprising the step of:
   D. freezing and aerating simultaneously the cooled liquid dessert mixture to form an aerated frozen dessert having an overrun of about 40% to 100% by volume.

16. The method of claim 14 additionally comprising the step of:
   D. freezing and aerating simultaneously the cooled liquid dessert mixture to form an aerated frozen dessert having an overrun of about 40% to 100% by volume.

17. The method of claim 6 additionally comprising the step of:
   D. freezing and aerating simultaneously the cooled liquid dessert mixture to form an aerated frozen dessert having an overrun of about 40% to 100% by volume.

18. The method of claim 7 additionally comprising the step of:
   D. freezing and aerating simultaneously the cooled liquid dessert mixture to form an aerated frozen dessert having an overrun of about 40% to 100% by volume.

19. The method of claim 8 additionally comprising the step of:
   D. freezing and aerating simultaneously the cooled liquid dessert mixture to form an aerated frozen dessert having an overrun of about 40% to 100% by volume.

20. The method of claim 9 additionally comprising the step of:
   D. freezing and aerating simultaneously the cooled liquid dessert mixture to form an aerated frozen dessert having an overrun of about 40% to 100% by volume.

21. The method of claim 11 additionally comprising the step of:
   D. freezing and aerating simultaneously the cooled liquid dessert mixture to form an aerated frozen dessert having an overrun of about 40% to 100% by volume.

22. The method of claim 12 additionally comprising the step of:
   D. freezing and aerating simultaneously the cooled liquid dessert mixture to form an aerated frozen dessert having an overrun of about 40% to 100% by volume.

23. The method of claim 13 additionally comprising the step of:
   D. freezing and aerating simultaneously the cooled liquid dessert mixture to form an aerated frozen dessert having an overrun of about 40% to 100% by volume.

24. The method of claim 10 additionally comprising the step of:
   D. freezing and aerating simultaneously the cooled liquid dessert mixture to form an aerated frozen dessert having an overrun of about 40% to 100% by volume.

25. A liquid dairy dessert mix suitable for agitated freezing into an aerated frozen dessert prepared according to the method of claim 1, 2, 3, 4 or 5.

26. A liquid dairy dessert mix suitable for agitated freezing into an aerated, soft serve dessert of reduced fat content prepared according to the process of claim 6, 8 or 13.

27. A liquid dairy dessert mix suitable for agitated freezing into an aerated soft serve, non-fat dessert, prepared according to the process of claim 12.

28. A soft serve, aerated dairy frozen dessert of reduced fat content having the organoleptic attributes of a high fat ice cream prepared according to the process of claim 17 or 19.

29. A soft serve aerated reduced fat frozen dairy dessert having the organoleptic attributes of a high fat ice cream prepared according to the process of claim 23.

30. A soft serve aerated non-fat dairy dessert having the organoleptic attributes of a high fat ice cream prepared according to the process of claim 16 or 21.

31. A bulk type, aerated frozen dairy dessert having a reduced fat content having the organoleptic attributes of a high fat ice cream and increased heat shock stability prepared according to the process of claim 24.

* * * * *